United States Patent
Fattepur et al.

(10) Patent No.: US 10,076,082 B2
(45) Date of Patent: Sep. 18, 2018

(54) CHOPPER MECHANISM FOR STALKED CROP

(71) Applicant: DEERE & COMPANY, Moline, IL (US)

(72) Inventors: Surfraj Fattepur, Bijapur (IN); Guy Burch, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 173 days.

(21) Appl. No.: 15/019,316

(22) Filed: Feb. 9, 2016

(65) Prior Publication Data

US 2016/0235010 A1 Aug. 18, 2016

(30) Foreign Application Priority Data

Jan. 27, 2016 (IN) .......................... 518/MUM/2015

(51) Int. Cl.
*A01F 29/06* (2006.01)
*A01D 45/10* (2006.01)
*A01F 29/09* (2010.01)

(52) U.S. Cl.
CPC .............. *A01F 29/06* (2013.01); *A01D 45/10* (2013.01); *A01F 29/095* (2013.01)

(58) Field of Classification Search
CPC ......... A01F 29/00–29/22; A01D 45/10; A01D 75/12
See application file for complete search history.

(56) References Cited

U.S. PATENT DOCUMENTS

| 1,929,586 A | * | 10/1933 | Holland-Letz | ........ A01F 29/095 241/238 |
| 2,845,972 A | * | 8/1958 | Hedtke | ................. A01F 29/095 241/244 |
| 3,141,281 A | | 7/1964 | Gaunt et al. | |
| 3,673,774 A | | 7/1972 | Mizzi | |
| 3,863,431 A | * | 2/1975 | Fowler | ................... A01D 45/10 56/11.9 |

(Continued)

FOREIGN PATENT DOCUMENTS

| WO | 2013134397 A1 | 9/2013 |
| WO | 2014031314 A3 | 5/2014 |

OTHER PUBLICATIONS

Background Information (admitted as prior art before Feb. 18, 2015).
Deere brochure on 700K, 750K, 850K Dozers (Aug. 7, 2013).

*Primary Examiner* — Alicia Torres
*Assistant Examiner* — Adam J Behrens

(57) ABSTRACT

A chopper mechanism for chopping stalk-like plant wherein the chopper mechanism includes a plurality of chopping elements that are removably mounted on the pair of chopper drums via associated holders. The chopping elements are mounted on the chopper drums circumferentially spaced apart and define a predetermined radial angle ($\alpha$) therebetween. Each of the chopping elements having a pair of substantially parallel cutting edges spaced apart by substantially parallel mounting surfaces. One of the cutting edges is selectively engaged in the chopping while the other cutting edge is enclosed within the holder. The parallel cutting edge of the chopping elements facilitates in reversing each chopping element depending on the degree of abrasion of the cutting edge.

15 Claims, 10 Drawing Sheets

(56) References Cited

U.S. PATENT DOCUMENTS

| | | | | |
|---|---|---|---|---|
| 3,995,520 | A * | 12/1976 | Spargo | A01D 45/10 56/13.9 |
| 4,065,912 | A | 1/1978 | Quick | |
| 4,319,718 | A * | 3/1982 | Snavely | A01F 29/22 241/101.2 |
| 4,443,999 | A * | 4/1984 | Leigers | A01D 45/10 144/229 |
| 4,550,552 | A * | 11/1985 | Stiff | A01D 45/10 56/13.9 |
| 4,584,824 | A * | 4/1986 | Hiyamuta | A01D 45/10 56/13.9 |
| 5,031,392 | A | 7/1991 | Baker | |
| 5,240,192 | A * | 8/1993 | Tilby | A01F 29/095 144/174 |
| 5,564,967 | A * | 10/1996 | Jorgensen | B27L 11/005 144/364 |
| 5,622,034 | A | 4/1997 | Dommert | |
| 6,062,009 | A * | 5/2000 | Caillouet | A01D 45/10 460/100 |
| 6,935,095 | B1 | 8/2005 | Sludder | |
| 7,409,972 | B2 * | 8/2008 | Haapasalo | B27G 13/04 144/174 |
| 8,162,249 | B2 * | 4/2012 | Andersson | B27L 11/005 241/294 |
| 8,167,226 | B2 * | 5/2012 | Engnell | B27L 11/005 241/294 |
| 8,272,701 | B2 | 9/2012 | Mulligan | |
| 8,615,978 | B2 * | 12/2013 | Hinds | B02C 18/18 56/13.9 |
| 2001/0002683 | A1 * | 6/2001 | Dykstra | A01F 29/095 241/242 |
| 2013/0111871 | A1 * | 5/2013 | Hinds | A01D 45/10 56/500 |
| 2014/0053523 | A1 | 2/2014 | Straeter et al. | |
| 2014/0096660 | A1 * | 4/2014 | Turner | C13B 5/08 83/651 |
| 2014/0208870 | A1 * | 7/2014 | Quaderer | G01F 1/30 73/861.73 |

* cited by examiner

CHOPPER MECHANISM FOR STALKED CROP

RELATED APPLICATIONS

This application claims priority to Indian patent application nos. 518/MUM/2015, filed on Feb. 18, 2015 and 518/MUM/2015, filed on Jan. 27, 2016, which are both incorporated by reference in their entirety.

FIELD OF THE DISCLOSURE

The present disclosure relates to the field of chopping stalked crop into a desired size.

BACKGROUND OF THE DISCLOSURE

Stalk crops, such as sugarcane and the like, are required to be harvested and in most cases they are required to be cut into billets. The stalk crops are cut into billets by means of choppers which are appropriately positioned on a harvester. The choppers are provided with blades, having a cutting edge, appropriately positioned to chop the stalked crops.

However, with continuous usage, the cutting edge of the blades is worn out or gets chipped. The worn out blades are required to be changed in order to enable proper chopping of the stalk crop. Presently available blades used in chopping operations in the choppers include a plurality of elongated blades spanning the length of a chopper drum while being mounted at a predefined radial distance from each other. In case of wearing out of one of the blades, the chopping operation is adversely affected. Hence, the worn out blade is required to be replaced with a new blade having a sharpened cutting edge. Also, due to the length of each blade, the entire length of the cutting edge is not effectively utilized. This results in under-utilization of the blade while increasing the inoperative time of the harvester. This results in increasing overall operational cost of the harvester.

The present invention envisages addressing the problems associated with the presently available blades, while reducing the inoperative time resulting from replacement of blades and not utilizing the maximum length of the cutting edge of each of the blades.

SUMMARY OF THE DISCLOSURE

A conventional chopper mechanism includes a pair of drums on which a plurality of blades are circumferentially spaced apart on each of the drums. The presently available blades used in the chopper mechanism have a length spanning the length of the drum with a single edge which is sharpened to facilitate chopping of stalk-like plants, such as, sugarcane into billets. During the chopping of the stalk-like plants, the entire sharpened edge is not effectively utilized in the chopping operation, however in case of wearing out or damage to a portion of the blade, the entire blade is required to be replaced. This reduces the effective usage of the sharpened edge of the blades and also increases the overall operating cost of the harvester. The present invention envisages overcoming the drawbacks of the conventional chopper mechanism by providing a solution for effectively using the blades, increasing the service life, and extending the replacement time for each blade.

In accordance with the present invention there is provided a chopper mechanism for chopping stalk-like plants. The chopper mechanism comprises a plurality of chopping elements mounted on a pair of chopper drums via a holder.

Each of the chopping elements has a pair of substantially parallel cutting edges spaced apart by substantially parallel mounting surfaces. Each of the cutting edges is selectively engaged in the chopping of the chopping stalk-like plant into billets of predetermined size. Each of the cutting edges of the chopping element defines an obtuse angle, an acute angle, or a combination thereof with respect to the mounting surfaces. The selective engagement of each of the cutting edge corresponds to the degree of abrasion of the cutting edge.

Additionally, the chopping elements are defined with a support complementing a seat defined within the holder. The support is adapted to be at least one of an integrally formed structure and a discretely formed structure.

The holder and the positioning provisions are at least one of an integrally formed or discreetly formed.

Each of the chopper drums are defined by a plurality of positioning provisions, circumferentially spaced apart. Each of the chopper drums are arranged along a respective substantially parallel rotational axis. The chopping elements are associated with at least one of the chopper drums to facilitate pinchingly chopping the stalk plant in the chopping operation.

At least one holder cooperates with each of the positioning provisions. The holder is defined by a profiled recess to enable removably mounting one of the chopping elements there within via the mounting surfaces along a mounting plane. At least one of the cutting edges is adapted to be enclosed within the holder. Each of the adjacent chopping elements defines a predetermined radial angle therebetween. The predetermined radial angle is in the range of 0 degrees to 120 degrees. The cutting edges define a cutting plane substantially perpendicular to the mounting plane. The chopping elements are mounted within the holder by means of mounting means. The mounting means is a fastener, a dowel, a wedge arrangement, or a spring loaded arrangement.

In accordance with an embodiment of the present invention, a set of the chopping elements are arranged in an inline configuration on each of the chopper drums, along a mounting plane. A plurality of the sets of chopping elements is circumferentially arranged on the chopper drums, defining the predetermined radial angle therebetween.

In accordance with another embodiment of the present invention, the chopping elements are circumferentially arranged on the chopper drums in a staggered configuration, defining the predetermined radial angle therebetween.

Alternatively, the chopping elements are arranged on each of the chopper drums in at least one of the inline configuration and the staggered configuration.

Optionally, the chopping elements of each of the chopper drums are engaged with a complementary chopping element mounted on a surface, complementary to the chopping drums for chopping the stalk-like plant.

Various features, aspects, and advantages of the present invention will be apparent from the following detailed description of the invention when read in conjunction with the accompanying drawings wherein like numerals represent like components.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the disclosure may include any combination of features from one or more dependent claims, and such features may be incorporated, collectively or separately, into any independent claim.

DETAILED DESCRIPTION

Several stalk-like crops, such as sugarcane, is required to be cut into billets of a predetermined length, post harvesting. The harvesting of sugarcane has been mechanized by use of sugarcane harvesters. Sugarcane harvesters, besides enabling harvesting of sugarcane from fields, also facilitate in chopping the sugarcane stalks into billets of predetermined length by utilizing a chopper mechanism. Conventional chopper mechanisms include a pair of drums on which a plurality of blades are circumferentially spaced apart on each of the drums. The presently available blades used in the chopper mechanism have a length spanning the length of the drum with a single edge which is sharpened to facilitate chopping of sugarcane stalks into billets. During the chopping of the billets, the entire sharpened edge is not effectively utilized in the chopping operation, however in case of wearing out or damage to a portion of the blade, entire blade is required to be replaced. This reduces the effective usage of the sharpened edge of the blades and also increases the overall cost of the harvester. The present invention envisages overcoming the drawbacks of the conventional chopper mechanism by providing a solution for effectively using the blades and increasing the service life and extending the replacement time for each blade.

The embodiments herein and the various features and advantageous details thereof are explained with reference to the non-limiting embodiments in the following description. Descriptions of well-known components and processing techniques are omitted so as to not unnecessarily obscure the embodiments herein.

Figure 1:
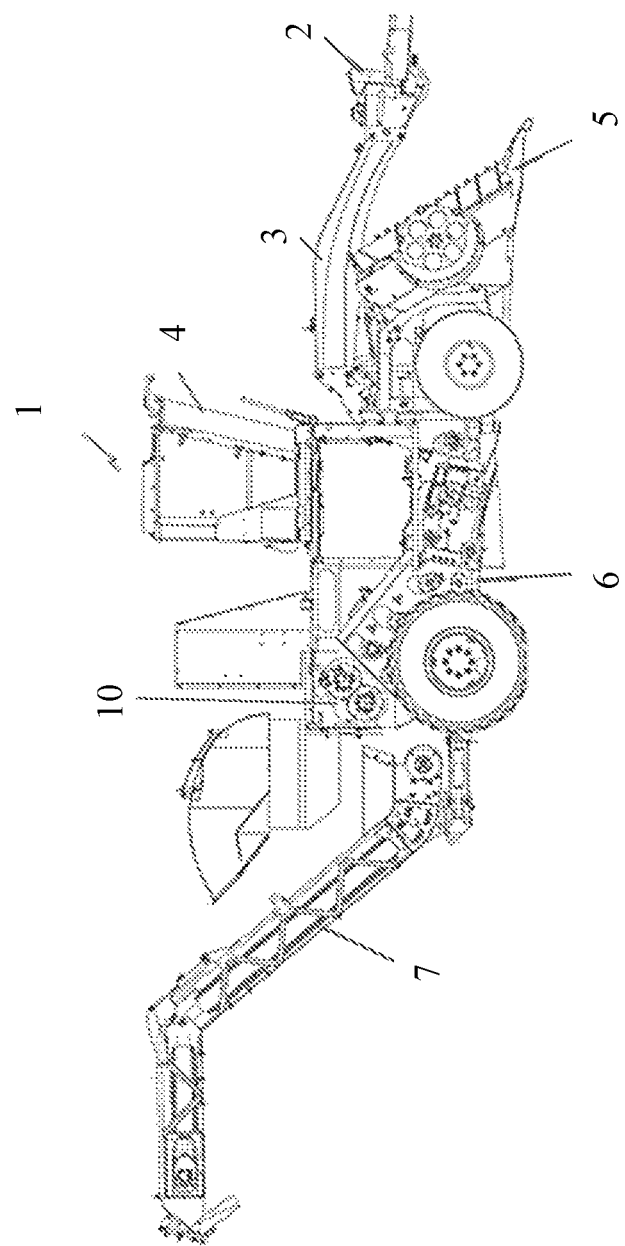
FIG. 1 illustrates side view of a sugarcane harvester, particularly indicating the chopper mechanism, in accordance with the present disclosure.

FIG. 1 illustrates a sugarcane harvester 1 that includes a top chopper 2 pivotally mounted by parallel arms 3. A pair of crop dividers 5 is arranged at the front end of the operator cab 4 and below the arms 3. A base cutter (not shown) enables cutting of the stalked crop from the base. The whole stalked sugarcane is fed by feed roller unit 6 into a chopper mechanism 10 of the present disclosure. The whole stalked sugarcanes are cut into billets by the chopper mechanism 10. Thereby sugarcane billets are conveyed from the chopper mechanism 10 via an elevator 7 to be loaded into a carrier vehicle (not shown) for transporting the billets for end usage. Although the chopper mechanism 10 will henceforth be described as being mounted on the sugarcane harvester 1, however, a person skilled in the art will appreciate that the chopper mechanism 10 can be used in any chopping operation, in association with a sugarcane harvester or without being associated with a sugarcane harvester.

Figure 2:
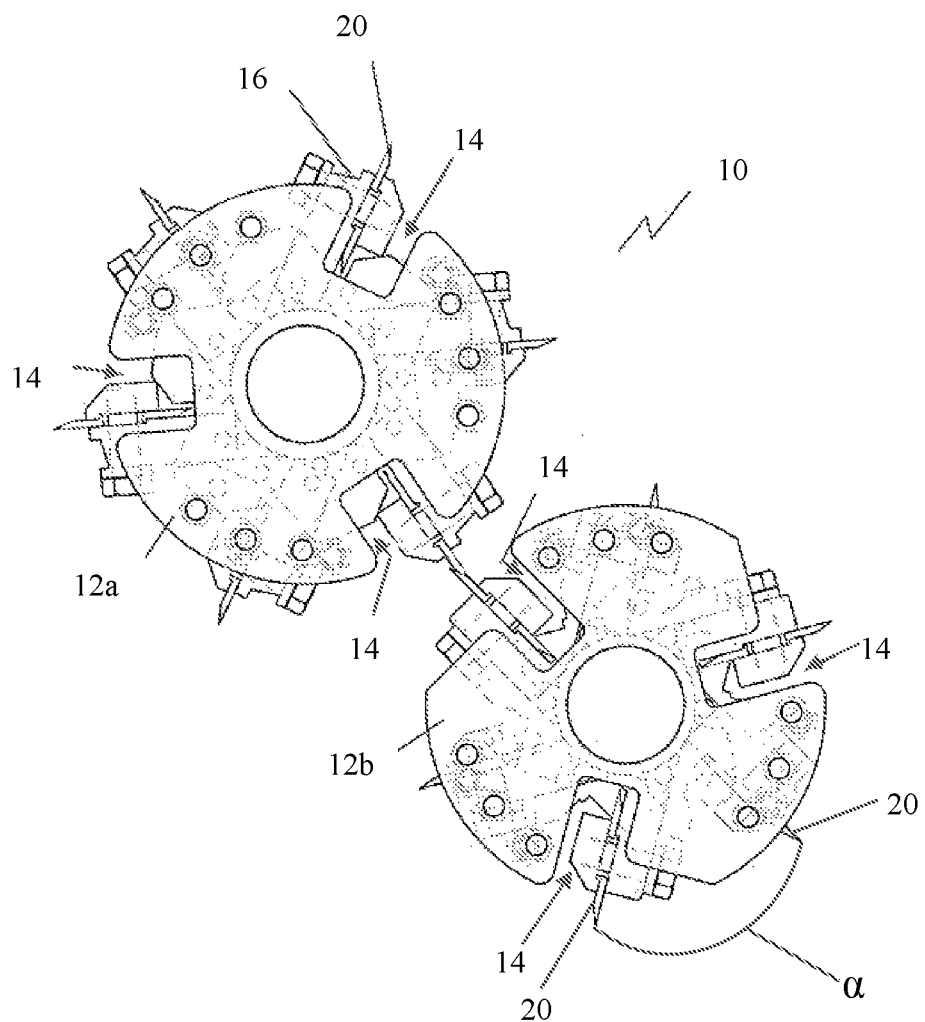
FIG. 2 illustrates the chopper mechanism in accordance with the present disclosure.

The chopper mechanism 10, illustrated in FIG. 2, in accordance with an embodiment of the present disclosure, includes a pair of chopper drums (12a and 12b), a plurality of holders 16, and a plurality of chopping elements 20. The chopper drums (12a and 12b), illustrated in FIG. 2, are substantially cylindrical in shape and are defined by a plurality of positioning provisions 14 which are circumferentially spaced apart on both the chopper drums (12a and 12b). The chopper drums (12a and 12b) are configured to rotate in opposing directions during operation of the chopper mechanism 10. The chopper drums (12a and 12b) are rotatable along substantially parallel rotational axes X-X and Y-Y respectively, illustrated in FIG. 7 and FIG. 8. Each of the positioning provisions 14 enables mounting of a chopping element 20 there within via the holder 16.

Figure 3:
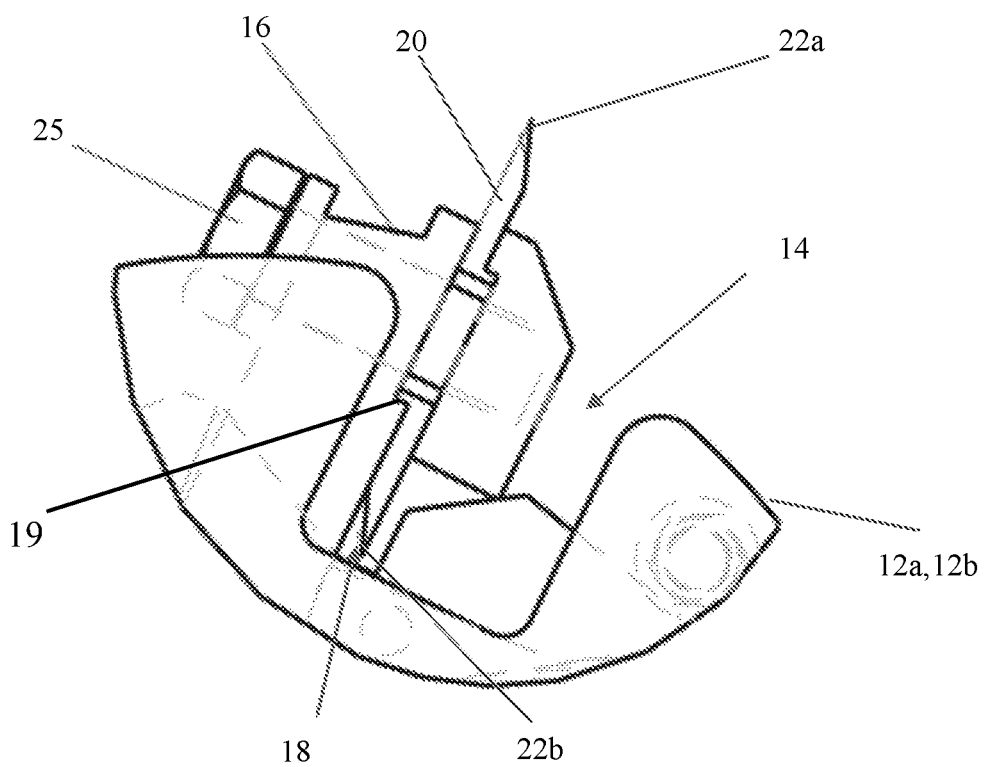
FIG. 3 illustrates holder and mounting arrangement for mounting a chopper element within the holder.

The holder 16, particularly illustrated in FIG. 3, defines a profiled recess 18. The holder 16 is either integrally formed within the positioning provisions 14 or is mounted within the positioning provisions 14 by appropriate arrangements. The holder 16 is either formed as a single element or formed by a plurality of elements to define the profiled recess 18. The profiled recess 18 is conformed to accommodate the chopping element 20 there within. The chopping elements 20 are either slidably mounted within each of the associated holders 16 or located within the profiled recess 18 by appropriately placing the chopping element 20 between the plurality of elements defining the profiled recess 18. The chopping element 20 is positioned within the profiled recess 18 so as to be removably mounted there within. The chopping element 20 is removably mounted within the holder 16 by means of mounting means 25. The mounting means 25 is a fastener, a dowel, or a spring loaded arrangement.

Figure 4:
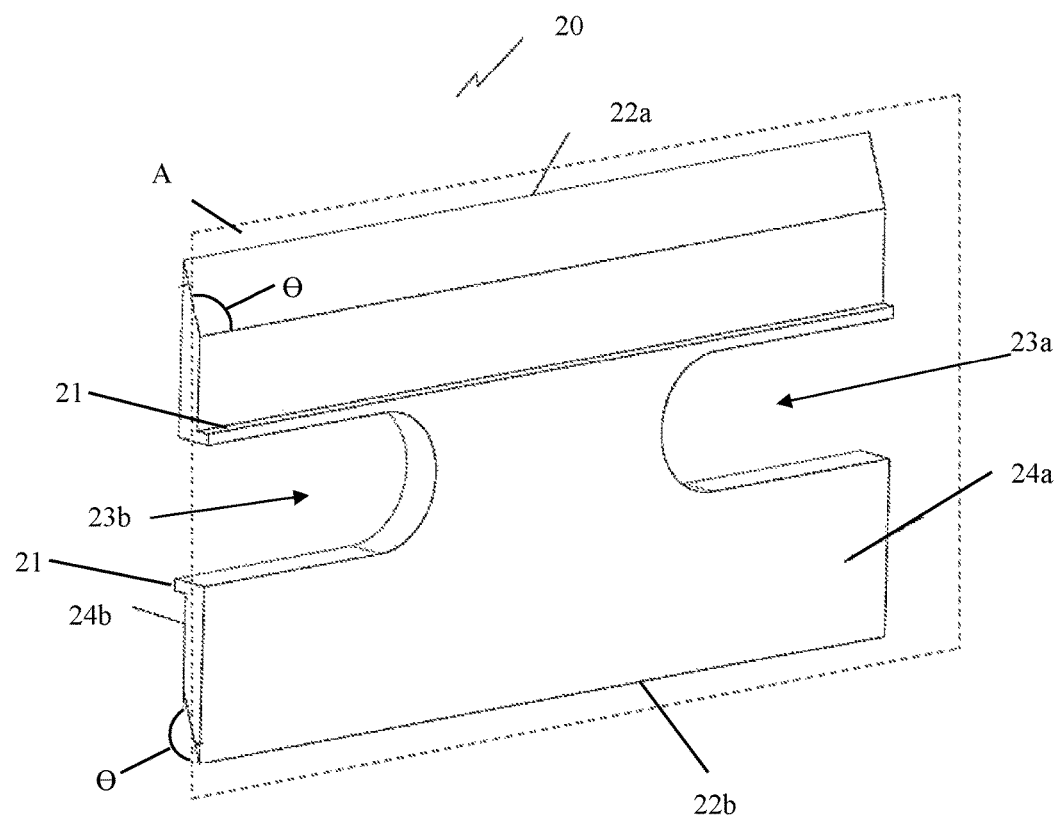
FIG. 4 particularly illustrates one embodiment of the chopper element, in accordance with the present disclosure.
Figure 5:
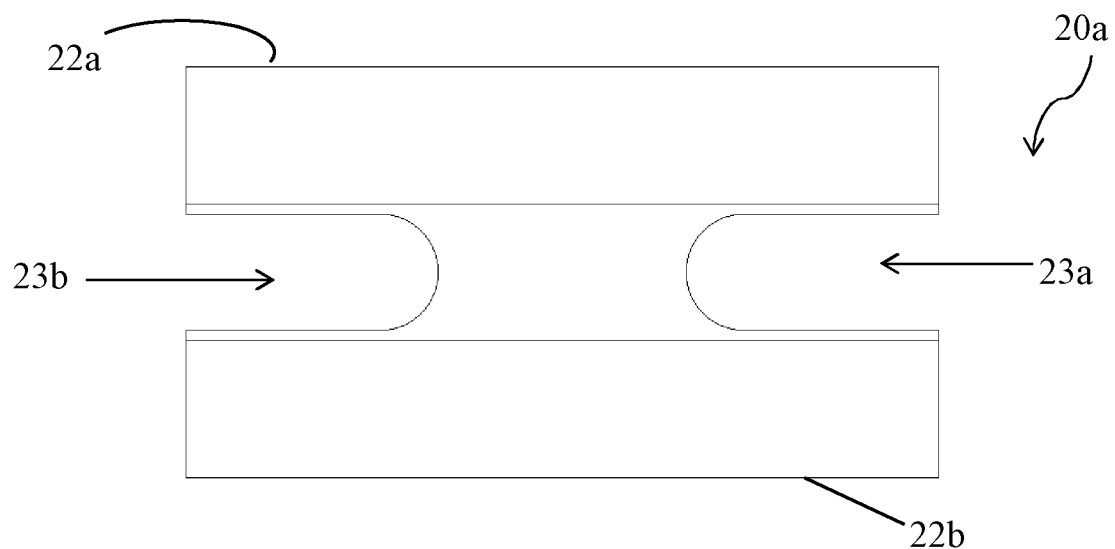
FIGS. 5 and 6 illustrate alternate embodiments of the chopper element, illustrated in FIG. 4.
Figure 6:
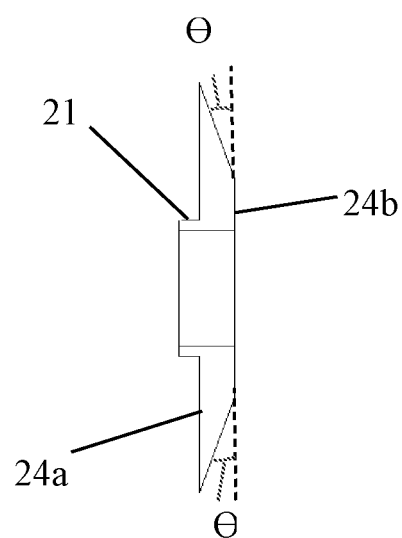
Figure 7:
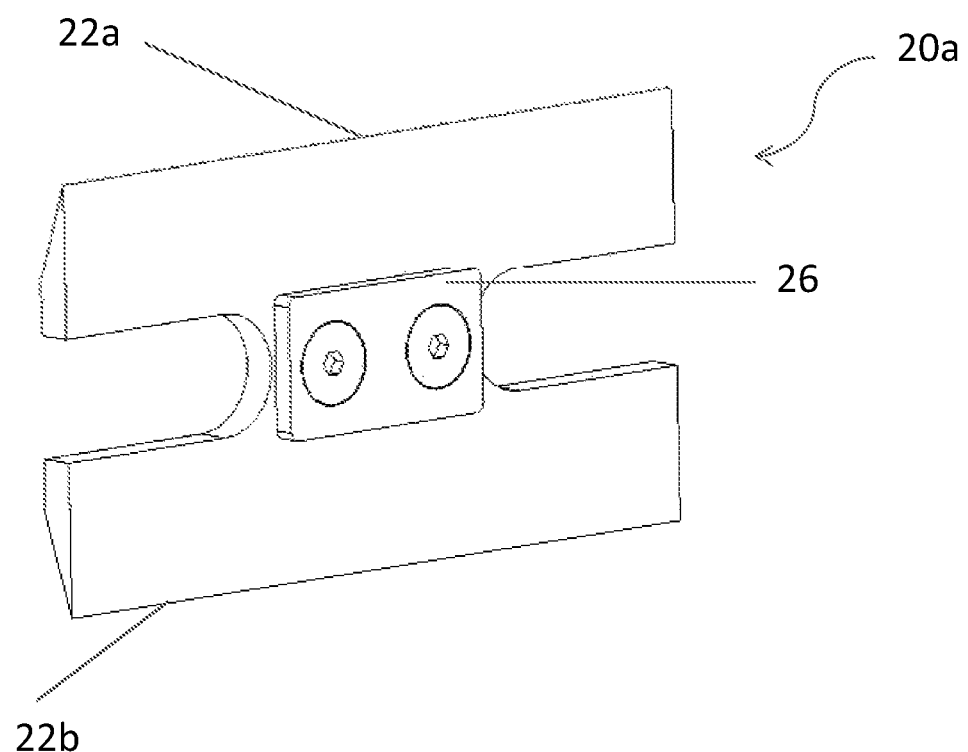
FIG. 7 illustrates another alternate embodiment of the chopper element, illustrated in FIG. 5.

FIG. 4 illustrates an embodiment of the chopping element 20. Each of the chopping elements 20, illustrated in FIG. 4, is defined by a pair of substantially parallel spaced apart cutting edges (22a and 22b). The cutting edge 22a and the cutting edge 22b are defined along the plane of the mounting surface 24b and mounting surface 24a, respectively. The mounting surfaces (24a and 24b) define mounting recesses (23a and 23b). The chopping elements 20 are profiled to be conformed within the profiled recess 18 of the holder 16 (illustrated in FIG. 3). Each of the cutting edges (22a and 22b) of the chopping element 20 defines a cutting angle (θ) to the mounting surfaces (24b and 24a). The cutting angle (θ) is an obtuse angle, an acute angle, or a combination thereof. The chopping elements 20 are mounted within the holder 16 along a mounting plane A. The cutting edges (22a and 22b) define a cutting plane substantially perpendicular to the mounting plane A. FIG. 5 and FIG. 6 illustrate an alternate embodiment of the chopping element 20, as illustrated in FIG. 4, indicated by the reference numeral 20a. Similar to the chopping element 20, the chopping element 20a has mounting surfaces (24a and 24b). The chopping element 20a includes a pair of spaced apart cutting edges 22a and 22b. However, unlike the chopping element 20, in the chopping element 20a, the cutting edges 22a and 22b are defined along the plane of the same mounting surface (24b or 24a). Hence, as shown in FIG. 5 and FIG. 6, the cutting edges 22a and 22b of the chopping element 20a are defined along the plane of the mounting surface 24a. The chopping elements 20 and the chopping elements 20a have support 21 defined on the mounting surface (24b or 24a), as particularly indicated in FIG. 4 and FIG. 6. In accordance with an embodiment, the support 21 may be integrally formed on the mounting surface (24b and/or 24a). In accordance with another alternate embodiment of the chopping element 20a, illustrated in FIG. 7, the support 26 is discrete from the chopping elements 20a. The support 26, as illustrated in FIG. 7, is fitted to the chopping elements 20a by fastening arrangement (e.g., bolts).

Figure 8:
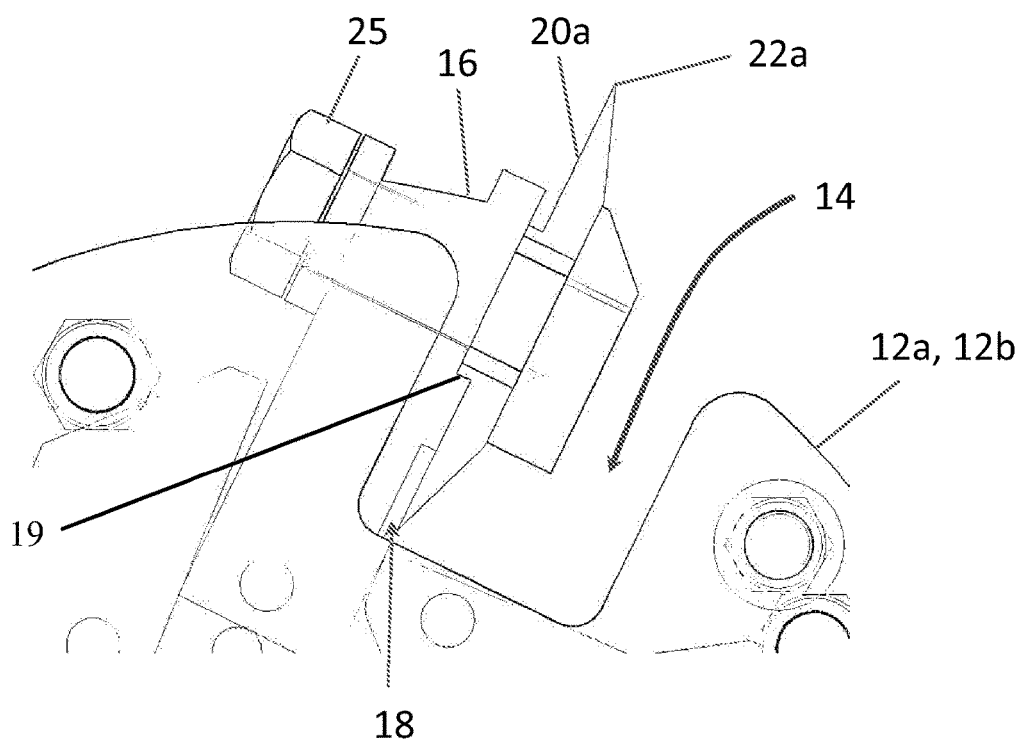
FIG. 8 illustrates a holder and mounting arrangement for mounting a chopper element, illustrated in FIG. 5 and FIG. 6, within the holder.

In the operational configuration of the chopper mechanism 10 for chopping of sugarcane into billets of predetermined length, one of the cutting edges (22a or 22b) is selectively engaged in chopping the sugarcane into billets while the other cutting edge (22b or 22a) is enclosed within the profiled recess 18 of the holder 16. The profiled recess 18 is provided with a blade seat 19 wherein the support 21 or the support 26 rests. Therefore, with the cooperation of the blade seat 19 and the support 21 or the support 26, the cutting edge of the chopping element 20 or 20a which is enclosed within the holder 16 is restricted from contacting any surface of the chopper drum (12a, 12b) or otherwise. This prevents the cutting edge of the chopping element 20 or 20a which is enclosed within the holder 16 from being damaged. Thus, as illustrated in FIG. 3, the chopping element 20 is mounted such that the cutting edge 22a projects from the holder 16 for being engaged in chopping of the sugarcane into billets. On the other hand, the cutting edge 22b is disposed within the holder 16 so as to be enclosed there within and is restricted from touching the surface of the chopper drum 12a or 12b. The cutting edge 22a or the cutting edge 22b is engaged in chopping of the sugarcane corresponding to the degree of abrasion. For example, referring to FIG. 3, when the cutting edge 22a is worn out by a predetermined degree of abrasion due to being engaged in chopping, the chopping element 20 is reversed such that the cutting edge 22b projects from the holder 16 while the worn out chopping edge 22a is enclosed within the holder 16. Referring to FIG. 8, similar to the arrangement of the chopping elements 20, the chopping element 20a is mounted on the chopper drum 12a or 12b and operates as described above.

The chopper mechanism 10 will henceforth be described with respect to the chopping elements 20 which are circumferentially arranged on either of the chopper drum (12a and 12b), as illustrated in FIG. 2, via the holders 16 such that each of the chopping elements 20 on each of the chopper drum (12a and 12b), define a predetermined radial angle ($\alpha$) with an adjacent chopping elements 20. The predetermined radial angle ($\alpha$) is in the range of 0 degrees to 120 degrees. However, it will be appreciated by people skilled in the art that the below arrangement will be applicable to chopper elements 20a, illustrated in FIG. 6 and FIG. 7.

Figure 9:
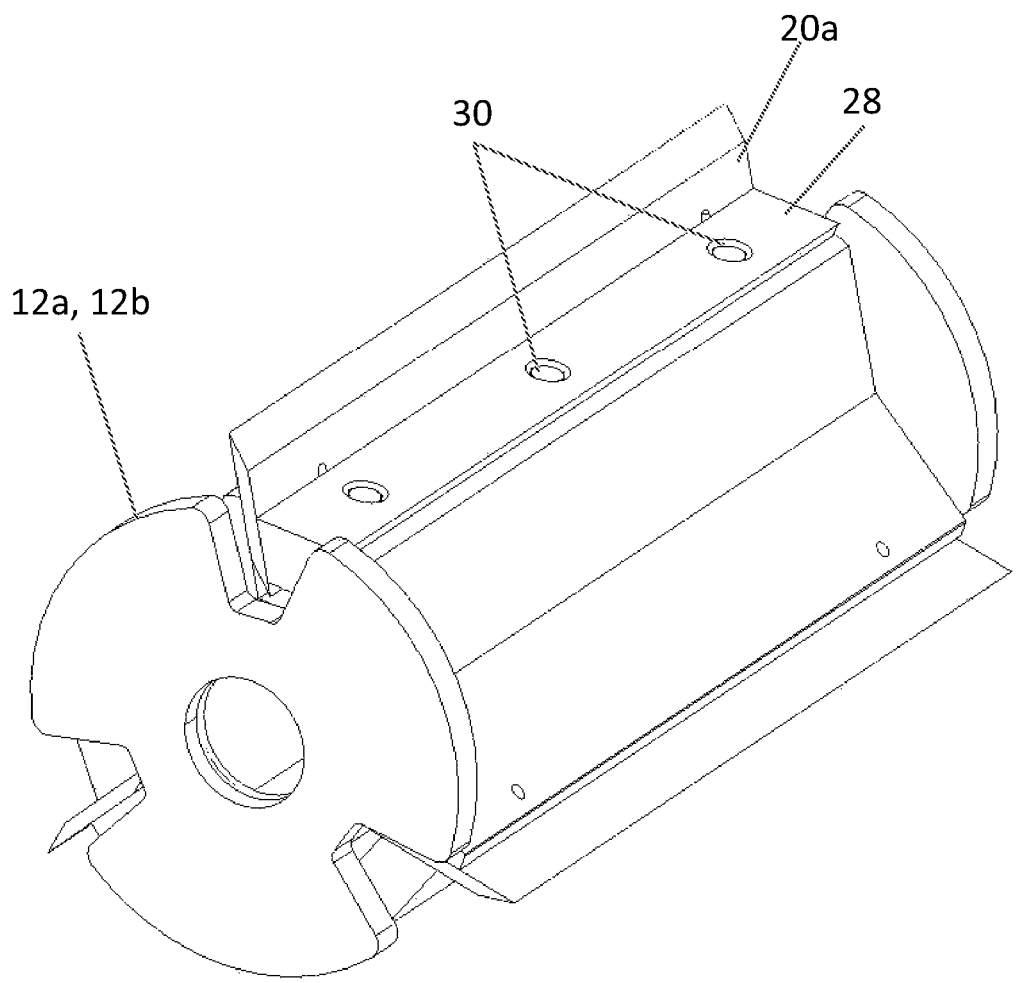
FIG. 9 illustrates alternate arrangement of the blade, illustrated in FIG. 3, arranged on the chopper drum, in accordance with an alternate embodiment.

In accordance with yet another embodiment of arranging the chopping elements 20 or 20a on the chopper drum 12a and/or 12b, illustrated in FIG. 9, the chopping elements 20 or 20a are positioned with the positioning provisions 14 by means of wedge 28. The chopping elements 20 or 20a are positioned within the positioning provisions 14 and fixed by tightening the position of the wedge 28 by means of bolts 30. The bolts 30 are perpendicular to the axis of the chopper drum (12a, 12b).

Figure 10:
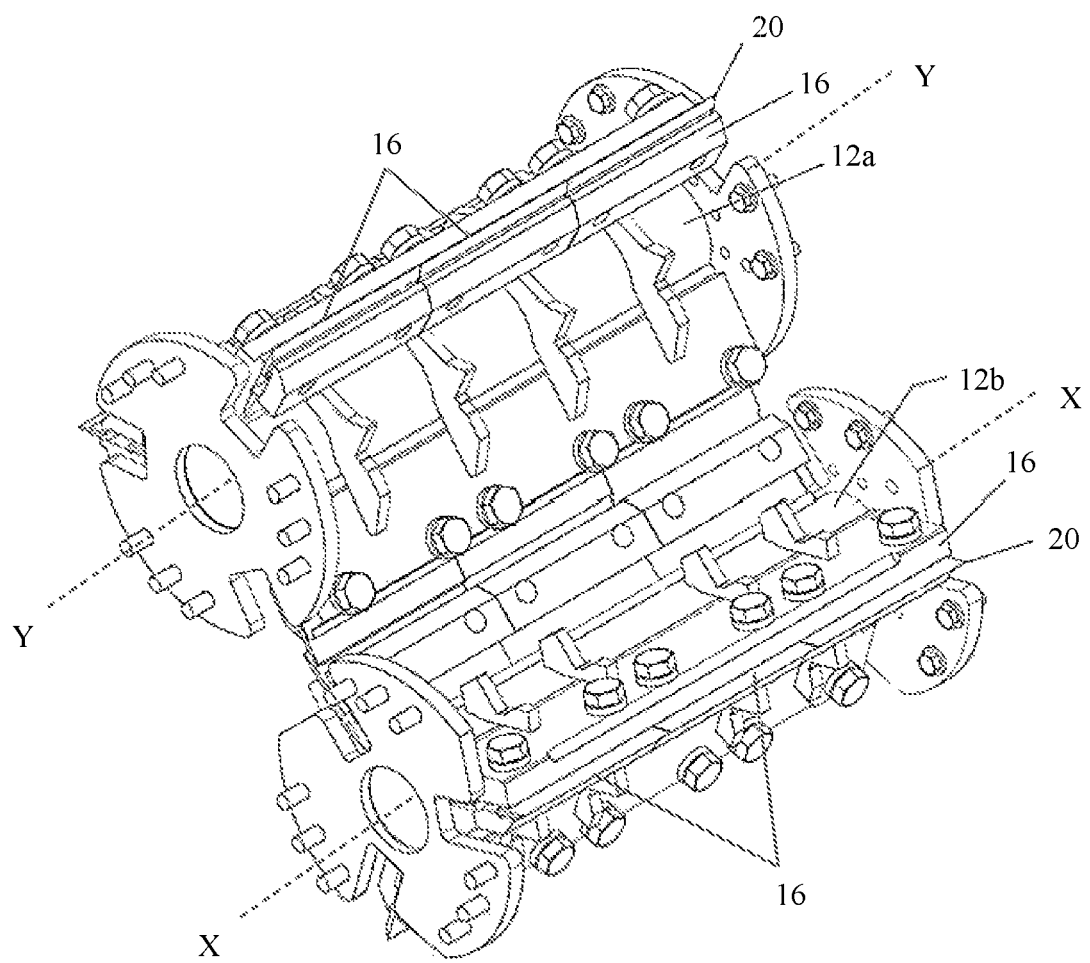
FIGS. 10 and 11 illustrate the chopper element, illustrated in FIG. 5 and FIG. 6, arranged on the chopper drum, in accordance with an alternate embodiment.

Referring to FIG. 10, a plurality of sets of the chopping elements 20 are arranged in an inline configuration such that each of the chopping elements 20 in a set are mounted along a single mounting plane. Each set of the chopping elements 20 are circumferentially arranged on the chopper drums to defining the predetermined radial angle ($\alpha$) therebetween. The arrangement of the chopping elements 20, illustrated in FIG. 7, envisages addressing the problem associated with presently available single elongated blade, spanning the length of the chopper drum (12a or 12b) wherein a plurality of elongated blades are positioned on the chopper drum (12a and 12b) in a circumferentially spaced apart manner, defining predetermined radial angle ($\alpha$) therebetween. Using the presently available blades, due to the length of the blade, the cutting edges are not effectively utilized throughout the length of the blade. Hence, the blades are required to be replaced although a portion of the cutting edge of the blade is worn out or damaged. Hence, in accordance with the present invention, each of the elongated blades is divided into smaller sections and is replaced by the plurality of chopping elements 20.

Figure 11:
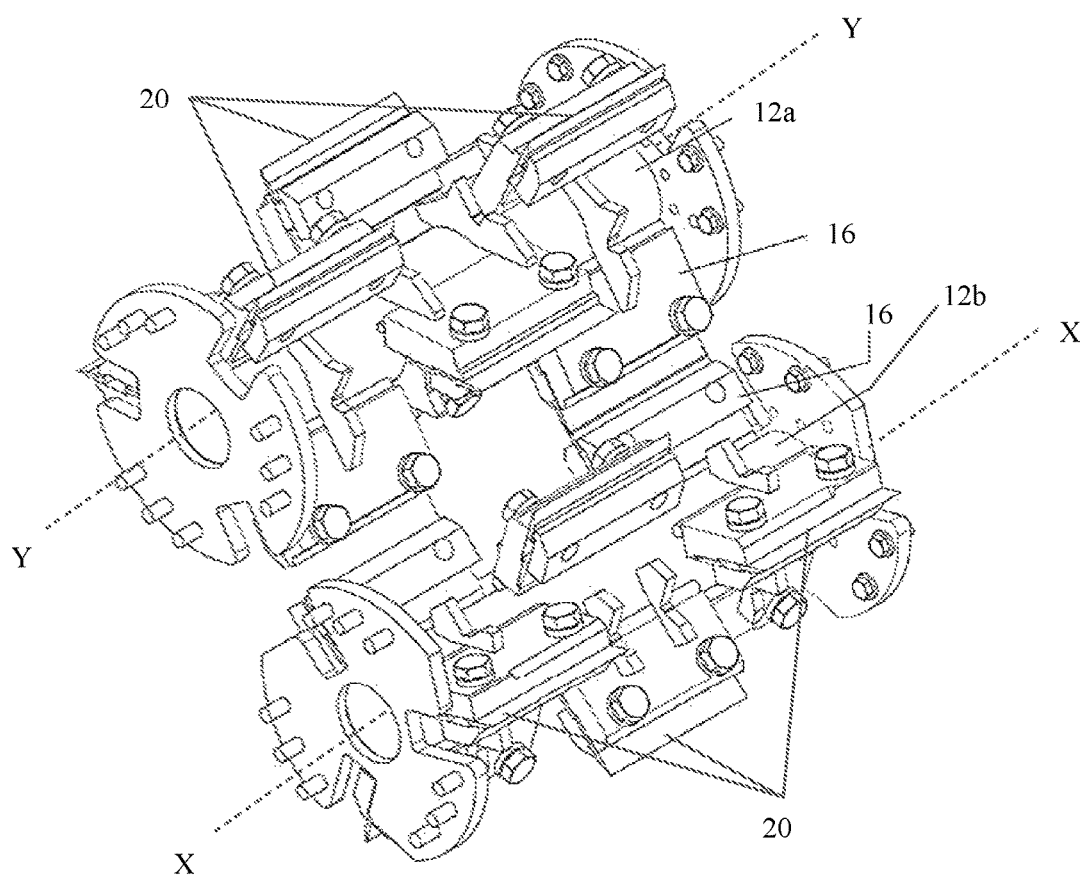

FIG. 11 illustrates an alternative arrangement of the plurality of chopping elements 20 on the chopper drum (12a and 12b) wherein the chopping elements 20 are circumferentially arranged on the chopper drums (12a and 12b) in a staggered configuration. Thus, each of the adjacent chopping elements 20, along the length of the chopper drums (12a and 12b) are arranged along separate mounting planes. Each of the chopping elements 20 define the predetermined radial angle ($\alpha$) with each of the chopping elements 20 circumferentially positioned on the chopper drum (12a and 12b).

According to another alternative embodiment (not shown), the chopping elements 20 may be arranged on the chopper drums 12a and the chopper drums 12b in the inline configuration and the staggered configuration respectively and vice versa.

In operation of the chopper mechanism 10, the sugarcane stalks are fed into the chopper mechanism 10, at least one of the chopping elements 20 associated with each of the chopper drums (12a and 12b) pinchingly chops the sugarcane stalks into billets of predetermined length.

According to another alternative embodiment (not shown) of the chopper mechanism 10, the chopper mechanism 10 includes at least one of the chopper drums (12a and 12b) and a complementary surface. In chopping the sugarcane stalks, the complementary surface includes one or more chopping elements 20 to be engaged with the chopping elements 20 mounted on the chopper drums (12a and 12b) to pinchingly chop the sugarcane stalks into billets of predetermined length.

Thus, the chopper mechanism 10 of the present invention enables providing a plurality of chopping elements 20 spanning the length and circumference of the chopper drums (12a and 12b). Further, utilizing a pair of edges of each chopping element 20 for chopping, the chopper mechanism 10 enables extending the time required for replacement of each chopping element 20, thereby increasing the service life of the chopping elements.

The present invention has several technical advancements, including but not limited to the realization of: a mechanism enabling maximum utilization of the length of the cutting edge of each blades; a mechanism which enables easy mounting of the blades on chopper drum; a mechanism enabling reduction in the halt time of harvester; a mechanism which enables extending the replacement time of each blade; and a mechanism increasing the overall effectiveness of a harvester.

While the foregoing specification has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure which comes within known or customary practice in the art to which this invention pertains.

Various features are set forth in the following claims.

What is claimed is:

1. A chopper mechanism for chopping stalk plants, the chopper mechanism comprising:
    a plurality of chopping elements having a pair of spaced apart substantially parallel cutting edges and planar mounting surfaces, each of the cutting edges being along at least one of the mounting surfaces, each of the cutting edges being selectively engaged in chopping;
    a plurality of chopper drums defined by a plurality of positioning provisions circumferentially spaced apart; and
    at least one holder cooperating with each of the positioning provisions, the holder defining a profiled recess to removably mount the chopping element there within via the mounting surfaces along a mounting plane (A), at least one of the cutting edges adapted to be enclosed within the holder,
    wherein, with respect to each of the chopper drums, the chopping elements are spaced circumferentially about that chopper drum to define a predetermined radial angle (a) therebetween, and
    wherein each chopping element comprises:
        a first end and a second end, between which the cutting edges of the chopping element extend lengthwise of the chopping element;
        each chopping element comprises a mounting recess extending from the first end of the chopping element toward the center of the chopping element and through the chopping element, from one mounting surface to the other mounting surface.

2. The chopper mechanism of claim 1, wherein the chopping elements are defined with a support complementing a seat defined within the holder, the support adapted to be at least one of an integrally formed structure and a discretely formed structure.

3. The chopper mechanism of claim 1, wherein the holder and the positioning provisions are at least one of integrally formed or discretely formed.

4. The chopper mechanism of claim 1, wherein each of the cutting edges of the chopping elements define at least one of an obtuse angle and an acute angle to the mounting surfaces.

5. The chopper mechanism of claim 1, wherein the predetermined radial angle (α) is in the range of 0 degrees to 120 degrees.

6. The chopper mechanism of claim 1, wherein the selective engagement of each of the cutting edges correspond to a degree of abrasion of the cutting edges, the chopping elements are adapted to chop the stalk plants into predetermined sized billets.

7. The chopper mechanism of claim 1, wherein a set of the chopping elements are arranged in at least one of an inline configuration and a staggered configuration, a plurality of the set of chopping elements being adapted to be circumferentially arranged on the chopper drums, defining the predetermined radial angle (α) therebetween.

8. The chopper mechanism of claim 1, wherein each of the chopper drums are arranged along respective substantially parallel rotational axis (X-X, Y-Y), the chopping elements associated with at least one of the chopper drums being adapted to pinchingly chop the stalk plants in a chopping operation.

9. The chopper mechanism of claim 1, wherein the chopping elements are arranged on each of the chopper drums in at least one of an inline configuration and a staggered configuration, the cutting edge being adapted to define a cutting plane substantially perpendicular to the mounting plane (A).

10. The chopper mechanism of claim 1, wherein the chopping elements of each of the chopper drums are engaged with a complementary chopping element mounted on a surface complementary to the chopping drums for chopping the stalk plants, the chopping elements are mounted within the holder with at least one of a fastener, a dowel, a wedge arrangement, and a spring-loaded arrangement.

11. The chopper mechanism of claim 2, wherein each support is configured as a lip.

12. The chopper mechanism of claim 11, wherein the lip is positioned within the holder such that, when the chopping element is inserted in the holder, the cutting edge positioned within the profiled recess is restricted from contacting any surface of the chopper drum.

13. The chopper mechanism of claim 11, wherein the lip extends outwardly from one of the mounting surfaces.

14. The chopper mechanism of claim 1, wherein each chopping element defines a central plane, the cutting edges of the chopping element are positioned on radially opposite sides of the central plane relative to a rotational axis of one of the chopper drums, and the cutting edges are asymmetrical about the central plane.

15. The chopping mechanism of claim 1 comprising a plurality of mounting devices, wherein the at least one holder comprises a plurality of holders, each mounting device extends through a respective one of the holders and the mounting recess of a respective one of the chopping elements.

* * * * *